(12) United States Patent
Santos Poli et al.

(10) Patent No.: US 12,146,857 B2
(45) Date of Patent: Nov. 19, 2024

(54) SYSTEM AND METHOD FOR DETECTING FLOODING IN A FLEXIBLE PIPE FROM A FLEXIBLE PIPE CONNECTOR

(71) Applicant: PETRÓLEO BRASILEIRO S.A.—PETROBRAS, Rio de Janeiro (BR)

(72) Inventors: Paulo Roberto Santos Poli, Rio de Janeiro (BR); Nei Mariano Da Fonseca Junior, Rio de Janeiro (BR); Marcos Antonio Da Silva, Duque de Caxias (BR); João Marcio De Castilho Santos, Rio de Janeiro (BR); Gustavo Pinto Pires, Rio de Janeiro (BR); Carlos Eduardo Maia De Souza, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 549 days.

(21) Appl. No.: 17/278,111

(22) PCT Filed: Sep. 20, 2019

(86) PCT No.: PCT/BR2019/050414
§ 371 (c)(1),
(2) Date: Mar. 19, 2021

(87) PCT Pub. No.: WO2020/056480
PCT Pub. Date: Mar. 26, 2020

(65) Prior Publication Data
US 2022/0128512 A1     Apr. 28, 2022

(30) Foreign Application Priority Data

Sep. 21, 2018    (BR) .......................... 1020180692429

(51) Int. Cl.
*G01N 29/04*     (2006.01)
*E21B 47/107*    (2012.01)
(Continued)

(52) U.S. Cl.
CPC ......... *G01N 29/043* (2013.01); *E21B 47/107* (2020.05); *E21B 47/117* (2020.05);
(Continued)

(58) Field of Classification Search
CPC .... G01N 29/043; G01N 29/09; G01N 29/227; G01N 2291/044; G01N 2291/048;
(Continued)

(56) References Cited

U.S. PATENT DOCUMENTS

| 4,775,855 A | 10/1988 | Cox | |
|---|---|---|---|
| 8,929,178 B2 * | 1/2015 | Lichter | .................. G01S 15/87 367/173 |

(Continued)

FOREIGN PATENT DOCUMENTS

| GB | 2446670 A | 8/2008 |
|---|---|---|
| GB | 2475337 A | 5/2011 |

*Primary Examiner* — Justin N Olamit
(74) *Attorney, Agent, or Firm* — Birch, Stewart, Kolasch & Birch, LLP

(57) ABSTRACT

This invention provides a system for detecting flooding in a flexible pipe from a connector of the flexible pipe, comprising: an ROV (3) comprising an arm element (18) designed to move an ultrasound sensor (13), until the ultrasound sensor (13) comes into contact with the connector (14) of the flexible pipe (17); and means for taking ultrasound measurements with respect to the state of the annulus of the flexible pipe (17) from a chamber of the connector of the flexible pipe (17) in contact with the annulus of the flexible pipe (17). The invention further provides a method for detecting flooding in a flexible pipe from a connector of the flexible pipe, comprising the steps of: moving an ROV (3) to a region close to the connector (14) of the flexible pipe (17); activating an arm element (18) of the ROV (3) to move an ultrasound sensor (13), until the ultrasound sensor (13) comes into contact with the connector (14) of the flexible pipe (18); and taking ultrasound measurements with respect to the state of the annulus of the flexible pipe (17) from a chamber of the connector (14) of the flexible pipe (17) in contact with the annulus of the flexible pipe (17).

10 Claims, 1 Drawing Sheet

(51) Int. Cl.
*E21B 47/117* (2012.01)
*G01M 3/24* (2006.01)
*G01N 29/09* (2006.01)

(52) U.S. Cl.
CPC ............ *G01M 3/243* (2013.01); *G01N 29/09* (2013.01); *G01N 2291/044* (2013.01); *G01N 2291/048* (2013.01); *G01N 2291/2634* (2013.01)

(58) Field of Classification Search
CPC ...... G01N 2291/2634; B65G 2008/005; B65G 2008/007; G10K 11/006; E21B 17/02–026; E21B 47/10; E21B 47/107; E21B 47/117; F17D 5/06; G01M 3/243
See application file for complete search history.

(56) References Cited

U.S. PATENT DOCUMENTS

| | | | |
|---|---|---|---|
| 8,995,225 B2* | 3/2015 | Nyholt | G01N 29/265 |
| | | | 367/104 |
| 9,784,716 B2 | 10/2017 | Keyworth | |
| 10,267,116 B2* | 4/2019 | Babbitt | E21B 33/064 |
| 10,408,795 B2* | 9/2019 | Nicolas | G01N 29/04 |
| 2005/0210961 A1 | 9/2005 | De Aquino | |
| 2017/0350866 A1 | 12/2017 | Nicolas et al. | |

* cited by examiner

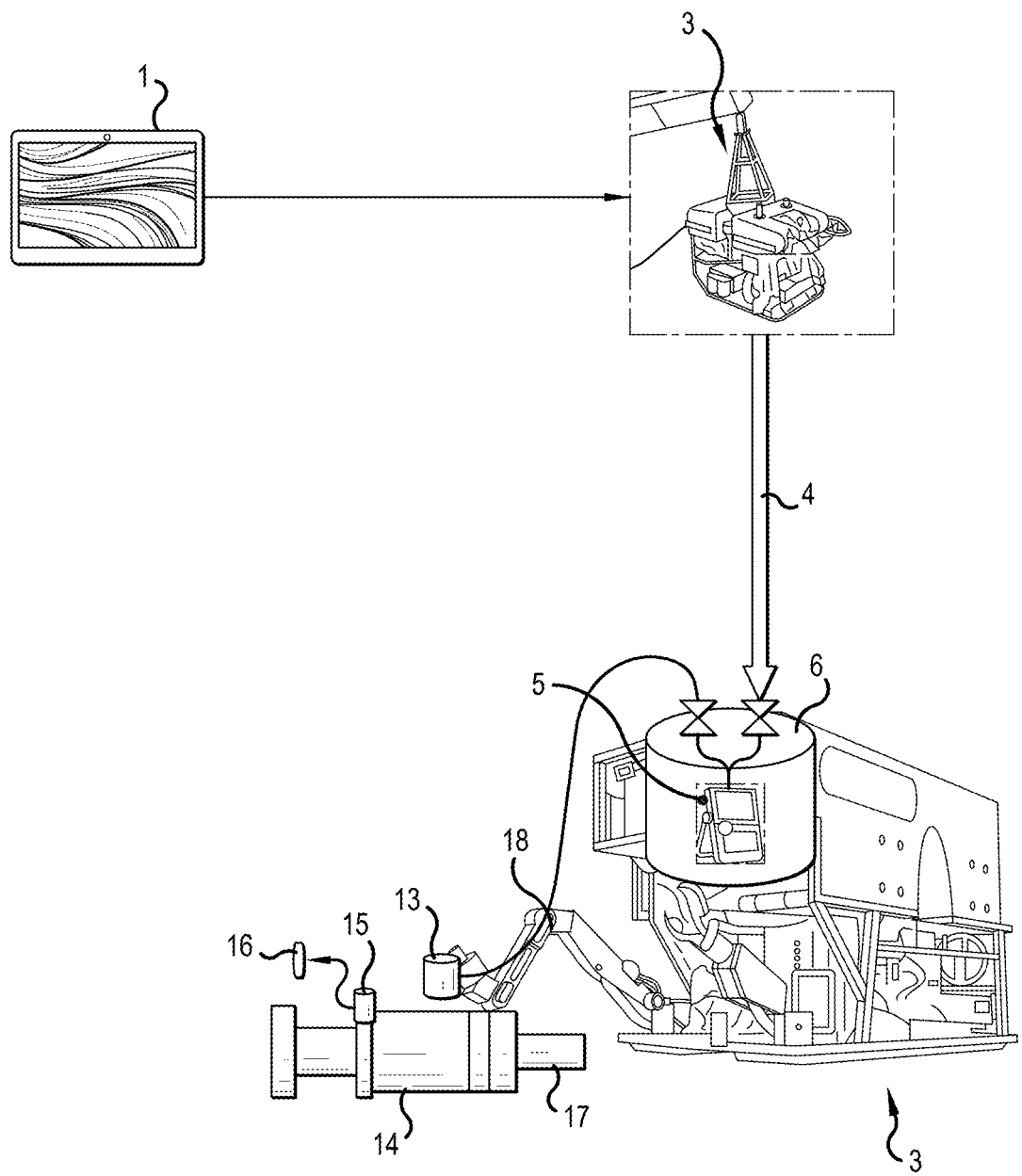

SYSTEM AND METHOD FOR DETECTING FLOODING IN A FLEXIBLE PIPE FROM A FLEXIBLE PIPE CONNECTOR

FIELD OF THE INVENTION

The present invention is in relation to technologies for inspecting subsea pipes. More specifically, this invention is in relation to systems for detecting flooding in a flexible pipe.

BACKGROUND OF THE INVENTION

In Brazil, the majority of offshore oil production is currently transported through flexible pipes. Pre-salt reservoirs have a vast amount of $CO_2$ that is transported with the oil which, together with other gaseous components, permeate the polymer sealing layer until reaching carbon steel metal layers in the annular space of the flexible pipe.

In particular, the designs for subsea production systems in the pre-salt layer in the Santos Basin are based on the use of collection systems that employ different subsea pipe designs, with rigid pipes, hybrid pipes (comprised of combinations of rigid and flexible pipes) having been used, and mainly flexible pipes, which represent more than 90% of the total hydrocarbons collection pipes installed in the Pre-Salt Layer. Due to the high content of $CO_2$ in the pre-salt layer, however, the use of flexible pipes is restricted because of the phenomenon of corrosion caused by $CO_2$ pressure.

In order for SCC—$CO_2$ to occur, the combination of several factors is necessary, including the presence of water and $CO_2$ in the annular space of the flexible pipes, combined with the forces of pressure/deformation of the pipe. Therefore, information on the status of the annular space in terms of the presence of water is fundamental for decisions that involve operational continuity or mobilization of resources for pipe replacement.

If there is water in this space, the conditions for occurrence of the mechanism of corrosion due to $CO_2$ pressure is created, with consequent corrosion and cracking with the possibility of rupture of the metal layers, loss of watertightness, and loss of integrity of these pipes.

Thus it becomes extremely important to know the condition of the annular space in regard to the presence of water. This water may come either from seawater or steam from condensed water from production, which also permeates the sealing layer. Pipes with a dry annulus may be considered intact and with full usage capacity.

The technologies available in the market in the current state of the technique use an inspection approach through the tubular body of flexible pipes. However, their multi-layered makeup with different materials and sizes has turned into a difficulty, and even an impediment for performing inspections, depending on the non-destructive testing technique used, and the type of the structure of the flexible pipe in question.

A first available technique is that which uses nitrogen injection or the creation of a vacuum from the pressure relief safety valve that is installed on the connectors of the flexible pipes. This method, however, is limited to the risers (section of the flexible pipe that is interconnected to the production unit) on the top, and requires precise knowledge of the free volume of the annulus of the pipe, as well as precise control of the injected gas volume. Although often used, this method sometimes leads to doubtful and questionable results.

Some patent documents in the state of the technique are focused on solutions for the indicated issues, of which the most relevant will be listed below.

Document BRPI0909162 is in relation to an ultrasound sweeping device for inspecting a pipe, which inspection is capable of identifying flooding of annular spaces of pipes.

Document U.S. Pat. No. 9,784,716B2 reveals a technique to assess the integrity of a section of pipe, such as a subsea flexible pipe, by means of a probe comprising an ultrasound system. Although not explicit in the title of this patent, the entire description refers to an inspection performed in the tubular body of pipes.

This method has been shown to be valid and functional in the majority of the scenarios where it has been used, to wit, much more specifically in the North Sea, with shallower water depths (to 700 meters) and simpler flexible pipe structures (fewer layers and lower pressure). However, in the reality of the pre-salt, where the inspection of flexible pipes must be conducted in deep water of up to 2250 meters, and with more complex structures (double polymer layers, thermal insulation), the system has presented difficulties and even errors, especially with respect to the methodology of data analysis used up to now.

One of the main negative impacts in patent method U.S. Pat. No. 9,784,716B2 is hydrostatic pressure. The greater this pressure, that is, the greater the depth, the greater the compression of the outer layer against the internal layers, allowing transmission of the ultrasound signal to the metal layers, even in the condition of a dry annular area. This makes the use of this technique in pipes used in very deep waters unviable.

Document U.S. Pat. No. 8,668,406B2, in turn, reveals another method for inspecting flexible pipes through a technique that uses electrical principles. The method allows determination of the type of an interface layer (solid, liquid or gas), located between a layer of outer pipe and a layer of inner pipe, by reading the polarity of the reflected signal.

This system describes a system that uses electromagnetic principles, that is, its performance does not rely on the multiple interfaces, but only on the distance between the sensor and the layer of interest (metal plates of the flexible pipe) or even of the medium (substances present in the annulus). This system is being developed, and therefore is not in the commercial phase for use in the field, which also makes its application unviable for the reality of the Brazilian pre-salt layer.

This being the case, the purpose of the invention is an inspection system capable of identifying the presence of water in the annulus of an operating flexible pipe, particularly in flexible pipes operating at very deep depths, which is a scenario of high hydrostatic pressure.

As will be better detailed below, this invention seeks to resolve the problems in the state of the technique described above in a practical and efficient manner.

SUMMARY OF THE INVENTION

The purpose of this invention is to provide a system and a method for detecting flooding in a flexible pipe that can be used reliably in flexible pipes in use at deep depths and under high hydrostatic pressure.

In order to attain the objectives described above, this invention provides a system for detecting flooding in a flexible pipe from a connector from the flexible pipe comprising: an ROV comprising an arm element that is designed to move an ultrasound sensor until the ultrasound sensor comes into contact with the connector of the flexible pipe;

and means for taking ultrasound measurements relating to the state of the annulus of the flexible pipe from a chamber of the connector of the flexible pipe in contact with the annulus of the flexible pipe. The invention further provides a method for detecting flooding in a flexible pipe from a connector from the flexible pipe comprising the steps of: moving an ROV to a region close to the connector of the flexible pipe; activating an arm element of the ROV to move an ultrasound sensor, until the ultrasound sensor comes into contact with the connector of the flexible pipe; and to perform ultrasound measurements with respect to the state of the annulus of the flexible pipe from a chamber of the connector of the flexible pipe in contact with the annulus of the flexible pipe.

BRIEF DESCRIPTION OF THE FIGURES

The detailed description presented below references the annexed FIGURES and their respective reference numbers.

FIG. 1 illustrates a schematic view of the system for detecting flooding in a flexible pipe from a connector of the flexible pipe, in accordance with a specific configuration of this invention.

DETAILED DESCRIPTION OF THE INVENTION

First, it is noted that the following description will begin with a preferred embodiment of the invention. As will become evident to any expert in the matter, however, the invention is not limited to that particular embodiment.

FIG. 1 illustrates a schematic view of the system for detecting flooding in a flexible pipe from a connector of the flexible pipe, in accordance with a specific configuration of this invention.

More broadly, the system for detecting flooding in a flexible pipe 17 from a connector 14 of the flexible pipe 17 comprises: an ROV 3 comprising an arm element 18 that is designed to move an ultrasound sensor 13, until the ultrasound sensor 13 comes into contact with the connector 14 of the flexible pipe 17; and means for taking measurements of the state of the annulus of the flexible pipe 17 from a chamber of the connector of the flexible pipe in contact with the annulus of the flexible pipe.

In this broader case, a method is also provided for detecting flooding in a flexible pipe 17 from a connector 14 of the flexible pipe 17, associated with the system described above, comprising the steps of: moving an ROV 3 to a region close to the connector 14 of the flexible pipe 17; activating an arm element 18 of the ROV 3 to move an ultrasound sensor 13, until the ultrasound sensor 13 comes into contact with the connector 14 of the flexible pipe 17; and taking measurements with respect to the state of the annulus of the flexible pipe 17 from a chamber of the connector 14 of the flexible pipe 17 in contact with the annulus of the flexible pipe 17.

Optionally, the ROV 3 may be connected to a control device 1 (such as a computer) adapted to manage the system's other electronic elements.

Optionally, the ROV 3 may comprise a pressure vessel 6 internally comprising an ultrasound device 5, in which the ultrasound device 5 is connected to the ultrasound sensor 13. Thus, the ultrasound sensor 13 sends the information received to the ultrasound device 5, which handles the information received and then sends the information handled to the control device 1. The control device 1 in turn analyzes the information to define the state of the annulus of the flexible pipe 17, from the information from the connector 14.

The ultrasound technique is based on the principle that a wave transmitted by a sensor 13 in a first means is partially reflected and partially transmitted upon coming into contact with the interface of a second means. The proportionality between reflection and transmission will depend on the difference of acoustic impedance between the means.

When the annulus of the flexible pipe 17 is dry, the chamber of the connector 14 of the flexible pipe 17 in contact with the annulus of the flexible pipe 17 will also be dry. Therefore, at the connectors the means that the ultrasound of this invention will cross are steel (connector) and air (chamber of the connector of the flexible pipe in contact with the annulus of the flexible pipe), the majority of the signal being reflected at the interface.

When the annulus of the flexible pipe 17 is flooded, the chamber of the connector 14 of the flexible pipe 17 in contact with the annulus of the flexible pipe 17 will also be flooded. Therefore, at the connector 14, the means that the ultrasound of this invention will cross are steel (connector) and water (chamber of the connector of the flexible pipe in contact with the annulus of the flexible pipe), a part of the signal being reflected and a part of the signal being transmitted. This part of the transmitted signal encounters the next surface/interface, which may be water with steel from the collector ring, or water with resin. The part of the signal transmitted at the first interface is now reflected in the second interface and returns to the sensor.

Visualization of the apparatus, optionally, has a graph called an A-Scan, which represents the signals in the space or at the time these reflections occur. The data is handled by observing where these reflections occur, and they are different in the conditions of dry and flooded annulus.

It is important to note that the method and the system proposed by this invention may be used with flexible pipes and connectors subjected to high hydrostatic pressures, such as in deep water applications, without there being elevated interference in the measurements. This great advantage is mainly due to the fact that the connector, since it is made of steel, is extremely resistant to hydrostatic pressure, making the method of this invention highly reliable in comparison to the methods known in the state of the technique.

The construction characteristics used by the system of the invention will be described below. However, note that the following description refers to an optional configuration in which modifications are foreseen without straying from the scope of protection.

The control device 1 may be interconnected by a cable 2 to the remote operating vehicle (ROV 3). The umbilical cable 4 of the ROV 3 may be interconnected to the ultrasound device 5 installed inside the pressure vessel 6.

The connector 7 of the umbilical from the ROV 3 and the connector 8 from the pressure vessel 6 may be any known in the state of the technique, and that have the characteristics necessary for each application, in which they do not represent a limiting factor for the scope of protection of this invention.

The umbilical 4 from the ROV 3 may provide routes both for electricity (power), and for transmission of inspection data. A cable inside 9 the pressure vessel 6 must interconnect the connector 11 and the ultrasound equipment 5. The ultrasound equipment 5 (inside the pressure vessel 6) must be interconnected to the ultrasound sensor 13.

A second internal cable 10 must interconnect the ultrasound equipment 5 to a second connector 11 in the pressure vessel 6. Another cable 12 must interconnect the connector 11 in the pressure vessel 6 to the ultrasound sensor 13 connected to the other end of this cable 12. This cable 12 may be subsea or it may even be a conventional cable wrapped by a pressure compensation sleeve.

As already described, the ultrasound sensor 13 must be brought close to the connector 14 using the resources of the ROV 3 to take measurements of the state of the annulus of the flexible pipe 17.

Optionally, there is also the approach to inspect using the ultrasound technique in the device 15 and/or monitoring by means of a lighting device 16 coupled to one of the gas relief valve accesses (or plugs). The lighting device 16 is designed to ascend when the chamber of the connector of the flexible pipe in contact with the annulus of the flexible pipe is filled with the water from the flooded annular space.

Therefore, the system of the invention optionally provides that the connector of the flexible pipes may comprise a device 15 designed to allow ultrasound inspection, identifying the presence of liquid in the chamber of the connector 14 of the flexible pipe in contact with the annulus of the flexible pipe 17. The device 15 may be defined by anyone versed in the matter, thus this does not represent a limiting factor to the scope of the invention.

Optionally, the device 15 is in communication with a lighting device 16 positioned externally to the connector 14. Thus, if the presence of liquid in the chamber of the connector 14 of the flexible pipe in contact with the annulus of the flexible pipe is identified, a luminous alert signal may be emitted, visually indicating the need to verify the integrity of the annulus of the flexible pipe.

Thus, the luminous alert described is part of an additional system that is independent from the ultrasound. These systems are complementary and redundant, yet independent. In an optional practical application, an inspection using ultrasound may be done only if the luminous system turns on.

Numerous variations to the scope of protection of this application are allowed. Thus, the fact that this invention is not limited to the specific configurations/implementations described above is reinforced.

The invention claimed is:

1. A system for detecting flooding in a flexible pipe from a connector of the flexible pipe, wherein it comprises:
   an ROV comprising an arm element designed to move an ultrasound sensor, until the ultrasound sensor comes into contact with the connector of the flexible pipe; and
   means for taking ultrasound measurements with respect to a state of an annulus of the flexible pipe from a chamber of the connector of the flexible pipe in contact with the annulus of the flexible pipe,
   wherein the connector of the flexible pipe comprises an ultrasound device designed to allow inspection by ultrasound, the ultrasound device identifying a presence of liquid in the chamber of the connector of the flexible pipe in contact with the annulus of the flexible pipe.

2. The system of claim 1, wherein the ROV comprises a pressure vessel comprising internally an ultrasound device, in which the ultrasound device is connected to the ultrasound sensor.

3. The system of claim 2, wherein the ROV is connected to a control device designed to manage the system's other electronic elements.

4. The system of claim 1, wherein the ROV is connected to a control device designed to manage the system's other electronic elements.

5. The system of claim 1, wherein the ultrasound device is in communication with a lighting device positioned externally to the connector, wherein the ultrasound device is coupled to one of the gas relief valve accesses of the connector to flexible pipes.

6. The method for detecting flooding in a flexible pipe from a connector of the flexible pipe, wherein it comprises the steps of:
   moving an ROV to a region close to the connector of the flexible pipe;
   activating an arm element of the ROV to move an ultrasound sensor, until the ultrasound sensor comes into contact with the connector of the flexible pipe; and
   taking ultrasound measurements with respect to a state of an annulus of the flexible pipe from a chamber of the connector of the flexible pipe in contact with the annulus of the flexible pipe.

7. The method of claim 6, wherein it comprises the step of the ultrasound sensor sending information generated to an ultrasound device, that handles information received and sends the handled information to a control device, wherein the control device analyzes the information to define the state of the annulus of the flexible pipe, from the information from the connector.

8. The method of claim 7, wherein it comprises the step of emitting an alert signal in response to information regarding a presence of liquid in the chamber of the connector of the flexible pipe in contact with the annulus of the flexible pipe.

9. The method of claim 6, wherein it comprises the step of emitting an alert signal in response to information regarding a presence of liquid in the chamber of the connector of the flexible pipe in contact with the annulus of the flexible pipe.

10. The method of claim 9, wherein it comprises the step of, if the presence of liquid is identified in the chamber of the connector of the flexible pipe in contact with the annulus of the flexible pipe, emitting a luminous alert signal externally to the connector.

* * * * *